(12) United States Patent
Karray et al.

(10) Patent No.: US 12,246,639 B2
(45) Date of Patent: Mar. 11, 2025

(54) METHOD FOR OPERATING AN AUTOMOTIVE ARRANGEMENT AND AUTOMOTIVE ARRANGEMENT

(71) Applicant: VALEO VISION, Bobigny (FR)

(72) Inventors: Marouene Karray, Bobigny (FR); Rabih Taleb, Bobigny (FR); Hafid El Idrissi, Bobigny (FR)

(73) Assignee: Valeo Vision, Bobigny (FR)

( * ) Notice: Subject to any disclaimer, the term of this patent is extended or adjusted under 35 U.S.C. 154(b) by 353 days.

(21) Appl. No.: 17/609,554

(22) PCT Filed: May 27, 2020

(86) PCT No.: PCT/EP2020/064772
§ 371 (c)(1),
(2) Date: Nov. 8, 2021

(87) PCT Pub. No.: WO2020/239875
PCT Pub. Date: Dec. 3, 2020

(65) Prior Publication Data
US 2022/0232678 A1    Jul. 21, 2022

(30) Foreign Application Priority Data

May 29, 2019  (FR) ........................................ 1905790
May 29, 2019  (FR) ........................................ 1905791

(51) Int. Cl.
*H05B 45/18* (2020.01)
*B60Q 1/14* (2006.01)
*G06N 20/00* (2019.01)

(52) U.S. Cl.
CPC ........... *B60Q 1/1423* (2013.01); *G06N 20/00* (2019.01); *H05B 45/18* (2020.01);
(Continued)

(58) Field of Classification Search
CPC ........ H05B 45/18; H05B 45/28; H05B 45/56; H05B 45/58; H05B 47/105; H05B 47/115;
(Continued)

(56) References Cited

U.S. PATENT DOCUMENTS 6,411,046 B1 * 6/2002 Muthu .................. H05B 45/22
362/800
7,140,752 B2   11/2006 Ashdown
(Continued)

FOREIGN PATENT DOCUMENTS

CN        1857034 A     11/2006
CN      105191505 A     12/2015
(Continued)

OTHER PUBLICATIONS

European Patent Office, International Search Report and Written Opinion of corresponding International Application No. PCT/EP2020/064772, dated Aug. 8, 2020.
(Continued)

*Primary Examiner* — Tung X Le
(74) *Attorney, Agent, or Firm* — Valeo Vision

(57) ABSTRACT

This invention provides a method for operating an automotive lighting device comprising at least one solid-state light source. This method comprises the steps of providing a plurality of sensors, configured to provide some device data, provide a control unit configured to receive and process the device data, generate an estimated condition of the lighting device based on the device data and controlling an operation parameter of the automotive lighting device using the estimated condition. The invention also provides a data processing element and a computer program to carry out this method and an automotive lighting device comprising a control unit which carries out this method.

12 Claims, 2 Drawing Sheets

(52) U.S. Cl.
CPC .. *B60Q 2300/112* (2013.01); *B60Q 2300/314* (2013.01); *B60Q 2300/42* (2013.01)

(58) Field of Classification Search
CPC .. H05B 47/155; B60Q 1/0408; B60Q 1/1407; B60Q 1/1423; B60Q 2300/42; B60Q 2300/112; B60Q 2300/314
See application file for complete search history.

(56) References Cited

U.S. PATENT DOCUMENTS

| | | | |
|---|---|---|---|
| 10,065,476 B2 | 9/2018 | Bonneau et al. | |
| 10,237,940 B2 | 3/2019 | Pelz et al. | |
| 10,582,593 B2 | 3/2020 | Chen et al. | |
| 11,137,449 B1* | 10/2021 | De Cicco | H05B 45/30 |
| 2005/0062446 A1 | 3/2005 | Ashdown | |
| 2005/0082553 A1 | 4/2005 | Yamamoto et al. | |
| 2006/0245174 A1* | 11/2006 | Ashdown | H05B 45/37 362/85 |
| 2006/0274540 A1 | 12/2006 | Klaver et al. | |
| 2007/0032913 A1* | 2/2007 | Ghoneim | B60W 40/10 701/1 |
| 2009/0016073 A1* | 1/2009 | Higgins-Luthman | B60Q 1/085 362/465 |
| 2010/0020117 A1 | 1/2010 | Higgins-Luthman et al. | |
| 2010/0020170 A1 | 1/2010 | Higgins-Luthman et al. | |
| 2012/0242242 A1 | 9/2012 | Linz et al. | |
| 2014/0184083 A1* | 7/2014 | Pelton | H05B 47/105 315/201 |
| 2016/0227616 A1* | 8/2016 | Lee | H05B 47/105 |
| 2017/0240107 A1 | 8/2017 | Fleurence et al. | |
| 2018/0184495 A1* | 6/2018 | Pelz | B60Q 11/00 |
| 2019/0306926 A1* | 10/2019 | Deering | B29C 45/14008 |
| 2021/0289604 A1 | 9/2021 | Ando | |

FOREIGN PATENT DOCUMENTS

| | | |
|---|---|---|
| CN | 107274695 A | 10/2017 |
| CN | 108016348 A | 5/2018 |
| CN | 109690569 A | 4/2019 |
| EP | 2157371 A2 | 2/2010 |
| EP | 2615866 A1 | 7/2013 |
| JP | 2009173123 A | 8/2009 |
| WO | 2022249966 A1 | 12/2022 |

OTHER PUBLICATIONS

European Patent Office, International Search Report and Written Opinion of corresponding International Application No. PCT/EP2020/063033, dated Jun. 16, 2020.

Japanese Patent Office, Official Action (with English translation) of corresponding Japanese Application No. 2021-562403, dated Oct. 4, 2022.

China Patent Office, Office Action of corresponding Chinese Application No. 202080039900.0, dated Jul. 21, 2023.

* cited by examiner

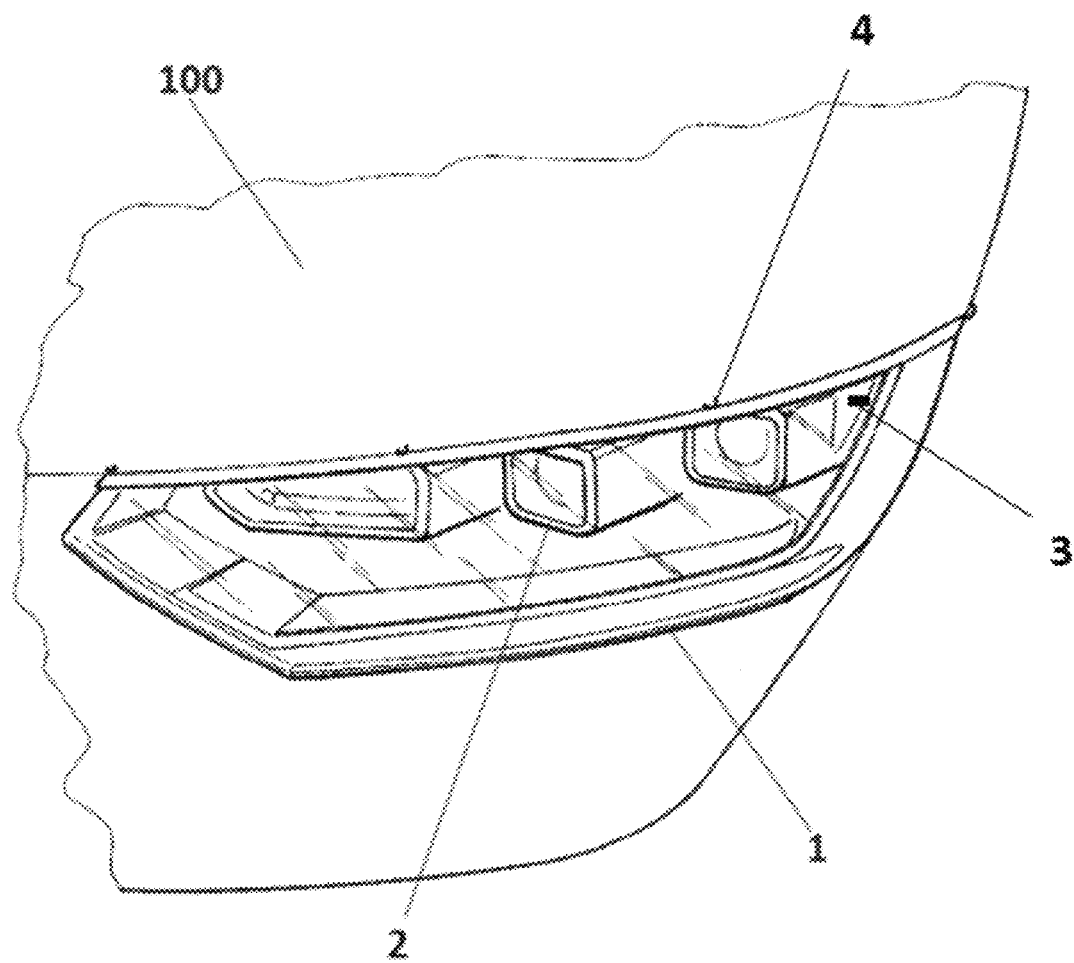
[Fig. 1]

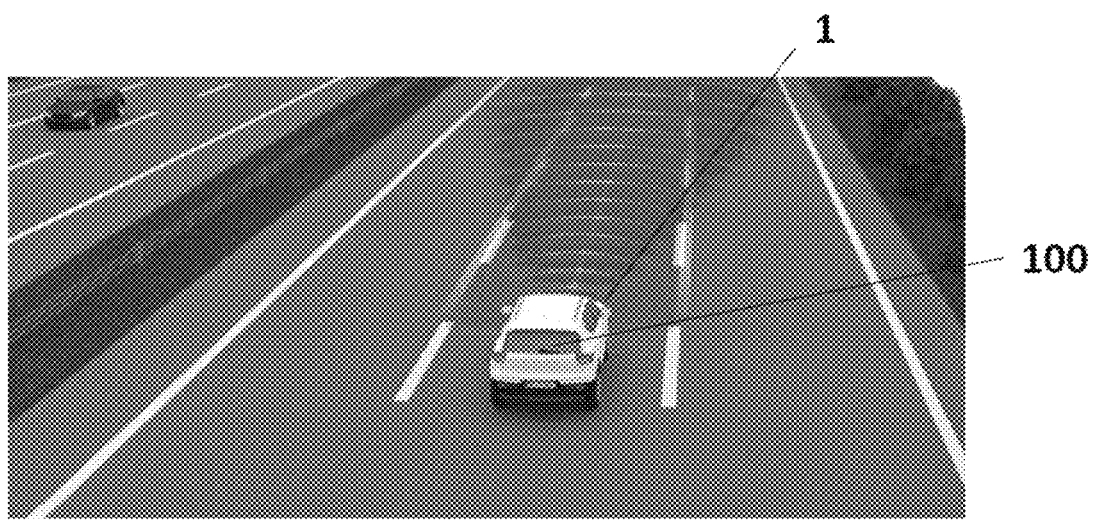
[Fig. 2]

METHOD FOR OPERATING AN AUTOMOTIVE ARRANGEMENT AND AUTOMOTIVE ARRANGEMENT

CROSS-REFERENCE TO RELATED APPLICATIONS

This is a 371 application (submitted under 35 U.S.C. § 371) of International Application No. PCT/EP2020/064772 (WO2020/239875) filed on May 27, 2020, which claims priority date benefit to French Application Nos. 1905790 and 1905791, both filed on May 29, 2019, the disclosures of which are incorporated herein by reference in their entirety.

TECHNICAL FIELD

This invention is related to the field of automotive lighting devices, and more particularly, to the temperature management of these devices.

BACKGROUND

Digital lighting devices are being increasingly adopted by car makers for middle and high market products.

These digital lighting devices usually comprise solid-state light sources, the operation of which heavily depends on temperature.

SUMMARY

Temperature control in these elements is a very sensitive aspect, and is usually carried out by sensing the temperature in the light source and derating, which means decreasing the current value which feeds the light source so that the output flux and the operation temperature decreases accordingly. This causes that the performance of the light sources must be heavily oversized to face these overheating problems, so that the operation values may be decreased while still maintaining acceptable values.

This problem has been assumed until now, but a solution therefor is sought.

The invention provides an alternative solution for managing the temperature of the light sources of an automotive lighting device by a method for operating an automotive lighting device according to claim 1, a data processing element according to claim 10, a computer program according to claim 11 and an automotive lighting device according to claim 12. Preferred embodiments of the invention are defined in dependent claims.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

In a first inventive aspect, the invention provides a method for operating an automotive lighting device comprising at least one solid-state light source, the method comprising the steps of:
  providing a plurality of sensors, configured to provide some device data;
  provide a control unit configured to receive and process the device data;
  generate an estimated condition of the lighting device based on the device data; and
  controlling an operation parameter of the automotive lighting device using the estimated condition.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the lifespan of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

With this method, the operation of the lighting device is not controlled by a temperature sensor, but by a wide range of data related to the whole operation of the lighting device, since the external temperature of the lighting device may be affected by much more data than a mere internal temperature.

In some particular embodiments, the step of processing the device data comprises estimating the external lighting device temperature by means of:
  training the control unit (3) to estimate the external lighting device temperature with a training dataset; and
  testing the control unit (3) with real external lighting device temperature data.

With this method, the external temperature of the lighting device is chosen as one parameter to control the heat dissipation in the lighting device. This value is not directly estimated by any of the known methods and is useful for an accurate control of the thermal evolution of the lighting device.

This way of training the control unit is useful since provides the control unit with the ability to estimate the external device temperature without using a direct sensor, based on indirect data. Hence, this control unit, when installed in an automotive lighting device, is able to estimate the external device temperature without a dedicated sensor.

In some particular embodiments, the operation parameter comprises at least one of a current value of the light source, a heat dissipation parameter, a flux threshold value of the low beam functionality, operation and/or power level of a fan, opening or closing of ventilation gates or operation of active cooling elements.

Due to the estimated condition of the lighting device, the control unit may perform a thermally oriented control in the lighting device, acting over one or more of the aforementioned features, so as to improve the thermal behavior of the lighting device.

In some particular embodiments, the control unit is configured to estimate the external lighting device temperature by means of:
  training the control unit to generate an estimated condition with a training dataset;
  simulate a first time for derating if no action is carried out;
  associate an action over an operation parameter to the values of the estimated condition;
  simulate the action over the operation parameter; and testing the control unit with the simulated action to verify whether the time for derating is greater than the first time for derating.

This way of training the control unit is useful since provides the control unit with the ability to choose the more effective action provided a set of device data. The derating time is used as a parameter to validate the effectiveness of an action in order to improve the thermal behavior of the whole lighting device.

In some particular embodiments, the step of training the control unit comprises the use of a machine learning algorithm.

This machine learning algorithm uses the sensors data as training data to calculate the optimal action.

In some particular embodiments, the plurality of sensors comprise at least one of a vehicle speed sensor, an ambient temperature sensor, an ambient humidity sensor, an external light sensor, an air speed sensor, a lighting functionality activation sensor, a light source temperature, a geo-positioning sensor or a camera to assess the presence of other vehicles.

These are examples of data which may be used to train and then estimate the optimal control action.

In some particular embodiments, the device data further comprises physical data of the automotive lighting device, such as the volume of the lighting device or a distance between two points of the lighting device.

The invention not only uses data obtained by sensors, but may also take into account the physical properties of the lighting device itself.

In some particular embodiments, the method further comprises the step of obtaining the light source temperature by a thermistor, such as a negative temperature coefficient thermistor.

Thermistors are a good option to obtain reliable temperature data.

In a further inventive aspect, the invention provides a data processing element comprising means for carrying out the steps of a method according to the first inventive aspect and a computer program comprising instructions which, when the program is executed by a control unit, cause the control unit to carry out the steps of a method according to the first inventive aspect.

In a further inventive aspect, the invention provides an automotive lighting device comprising:
- a matrix arrangement of solid-state light sources;
- a plurality of sensors configured to provide some device data; and
- a control unit for performing the steps of the method according to the first inventive aspect.

This lighting device provides the advantageous functionality of efficiently managing the thermal performance of the light sources, by means of an accurate value of the external device temperature.

In some particular embodiments, the matrix arrangement comprises at least 2000 solid-state light sources.

A matrix arrangement is a typical example for this method. The rows may be grouped in projecting distance ranges and each column of each group represent an angle interval. This angle value depends on the resolution of the matrix arrangement, which is typically comprised between 0.01° per column and 0.5° per column. As a consequence, many light sources may be managed at the same time.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures:

FIG. 1 shows a general perspective view of an automotive lighting device according to the invention.

FIG. 2 shows an automotive vehicle with a headlamp which comprises such a control unit.

In these figures, the following reference numbers have been used:
1 Headlamp
2 LED
3 Control unit
4 Sensors
100 Automotive vehicle

DETAILED DESCRIPTION

The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

FIG. 1 shows a general perspective view of an automotive lighting device according to the invention.

This headlamp 1 is installed in an automotive vehicle 100 and comprises:
- a matrix arrangement of LEDs 2, intended to provide a light pattern;
- a control unit 3 to perform a thermal control of the operation of the LEDs 2; and
- a plurality of sensors 4 intended to provide device data.

This matrix configuration is a high-resolution module, having a resolution greater than 2000 pixels. However, no restriction is attached to the technology used for producing the projection modules.

The control unit, previously to its installation in the automotive headlamp, has undergone a training process.

This training process comprises some machine learning steps, where the control unit is trained with training data provided by the plurality of sensors and from the physical properties of the lighting device itself. Among these training data values, the sensors include a vehicle speed sensor, an ambient temperature sensor, an ambient humidity sensor, an external light sensor, an air speed sensor, a lighting functionality activation sensor, a light source thermistor, a geo-positioning sensor or a camera to assess the presence of other vehicles. Further, the algorithm is also fed with physical data of the lighting device, such as the volume of the headlamp or internal headlamp dimensions.

The control unit receives these data and calculates, provided these conditions, the time remaining for derating. This time takes into account, e.g., the cooling effect of the air impinging in the headlamp, the presence of other vehicles surrounding the headlamp, the ambient temperature obtained by direct means and the ambient temperature of the location where the vehicle is going to travel to. All these data are used to calculate the first time for derating. The control unit then uses the data to associate an action over an operation parameter. For example, if the time for derating is short, less than 10 minutes, and the location in the next 30 minutes is a well lighted runway, the action may be reducing the intensity of the light modules. If the location has not enough light, the action may be increasing the power of the fan. Then, the control unit simulates the thermal behavior of the headlamp after this action is carried out. A second time for derating is obtained, due to the changing conditions in the headlamp after the considered action. This second time for derating will depend on the action which has been carried out, so the control unit learns which actions are the most appropriate in each circumstance. When this training is finished, the control unit is capable of deciding the most suitable action for each set of device data.

Once this training process is finished, the control unit is installed in an automotive vehicle 100 of FIG. 1, to perform a thermal control of the headlamp 1.

Once this trained control unit has been installed in the automotive lighting device, this control unit may perform an accurate and intelligent control of the thermal situation of the headlamp.

In alternative embodiments, the training data are used to estimate an external lighting device temperature. Among these training data values, the sensors include a vehicle speed sensor, an ambient temperature sensor, an ambient humidity sensor, an external light sensor, an air speed sensor, a lighting functionality activation sensor or a light source thermistor. Further, the algorithm is also fed with physical data of the lighting device, such as the volume of the headlamp or internal headlamp dimensions.

Estimated values are tested with real data from an external device temperature sensor, which is used during the training process. When this training is finished, the control unit is capable of estimating the external device temperature without using a dedicated sensor.

External headlamp temperature is a control parameter which is very useful to manage the current value of the LEDs, or the operation of the heat dissipation elements comprised in the headlamp 1. The trained control unit is a useful part in this control process.

FIG. 2 shows an automotive vehicle 100 with a headlamp 1 which comprises such a control unit. When the headlamp 1 is in operation, the control unit will perform the following actions:
  receive the data from the plurality of sensors and from the device data;
  generate an estimated condition of the lighting device based on the received data; and
  controlling an operation parameter of the automotive lighting device 1 using the estimated condition.

As described above, the control unit receives many data from the exterior of the vehicle 100: vehicle speed, ambient temperature, ambient humidity, external light, air speed, lighting functionality activation, light source temperature, geo-positioning or presence of other vehicles.

Once the control unit receives this information (both from the sensors and from the device data), it uses the data from the learning process to generate an estimated condition of the device data. This estimated condition may be the time for derating. This estimated condition, together with the data received by the control unit and the data learned in the learning process, provides the control unit with the information necessary to choose an action for controlling an operation parameter, so as to optimize the time for derating.

As described above, the control unit may manage a wide range of operation parameters, for example those related to the lighting module operation (the current value of the light source, the flux threshold of the low beam functionality, etc.) or a heat dissipation parameter (operation and power level of the fan, opening or closing of ventilation gates, active cooling elements, etc.).

In other embodiments of the method, the training data are used to estimate an external lighting device temperature, since the control unit was trained to estimate this value from the received data. External headlamp temperature is a control parameter which is very useful to manage the current value of the LEDs, or the operation of the heat dissipation elements comprised in the headlamp 1. The trained control unit is a useful part in this control process.

With this control unit, the lighting device avoids an excessive oversizing and optimize the lifespan of its parts.

What is claimed is:

1. A method for operating an automotive lighting device that applies at least one solid-state light source comprising:
  providing a plurality of sensors that are configured to provide some device data;
  providing a control unit configured to receive and process said device data;
  generating an estimated condition of the automotive lighting device based on said device data, the estimated condition derived from indirect data without a dedicated sensor; and
  controlling an operation parameter of the automotive lighting device using the estimated condition; and
  resulting in a decrease of current that is fed into said solid-state light source such that output flux value and an operation temperature value decreases, accordingly.

2. The method of claim 1, wherein the operation parameter includes at least one of a current value of the light source, a heat dissipation parameter or a flux threshold value of a low-beam functionality.

3. The method of claim 1, wherein a processing of the device data includes estimating an external lighting device temperature by:
  training the control unit to estimate the external lighting device temperature with a training dataset; and
  testing the control unit with a real external lighting device temperature data.

4. The method of claim 1, wherein the operation parameter includes at least an operations of a fan, modulating of ventilation gates, or an operation of active cooling elements.

5. The method of claim 4, wherein training the control unit includes utilizing a machine learning algorithm.

6. The method of claim 1, wherein the control unit is configured to generate the estimated condition by:
  training the control unit to generate an estimated condition with a training dataset;
  simulating a first time for derating if no action is carried out;
  associating an action over an operation parameter to a plurality of values of the estimated condition;
  simulating the action over the operation parameter; and
  testing the control unit with a simulated action to verify whether a time for derating is greater than the first time for derating.

7. The method of claim 1, wherein the plurality of sensors includes at least one of a vehicle speed sensor, an ambient temperature sensor, an ambient humidity sensor, an external light sensor, an air speed sensor, a lighting functionality activation sensor, a light source temperature, a geo-positioning sensor; or a camera to assess the presence of other vehicles.

8. The method of claim 7, further including obtaining the light source temperature by a thermistor.

9. The method of claim 1, wherein the device data further comprises physical data of the automotive lighting device.

10. A non-transitory computer program including instructions, which, when the program is executed by a control unit, causes the control unit to carry out a method resulting in a decrease of current that is fed into a solid-state light source such that output flux value and an operation temperature value is configured to decrease comprising:
- providing a plurality of sensors that are configured to provide some device data;
- providing the control unit configured to receive and process said device data;
- generating an estimated condition of the automotive lighting device based on said device data, the estimated condition derived from indirect data without a dedicated sensor; and
- controlling an operation parameter of the automotive lighting device using the estimated condition.

11. An automotive lighting device comprising:
- a matrix arrangement of solid-state light sources;
- a plurality of sensors configured to provide some device data;
- a control unit for performing a method resulting in a decrease of current that is fed into the matrix arrangement such that output flux value and an operation temperature value is configured to decrease comprising:
  - providing the plurality of sensors that are configured to provide some device data;
  - providing the control unit that is configured to receive and process said device data;
  - generating an estimated condition of the automotive lighting device based on said device data, the estimated condition derived from indirect data without a dedicated sensor; and
  - controlling an operation parameter of the automotive lighting device using the estimated condition.

12. The automotive lighting device of claim 11, wherein the matrix arrangement includes at least 2000 solid-state light sources.

* * * * *